March 17, 1953
J. P. CRAFT
2,631,419
STALK CUTTER
Filed April 10, 1951
2 SHEETS—SHEET 1
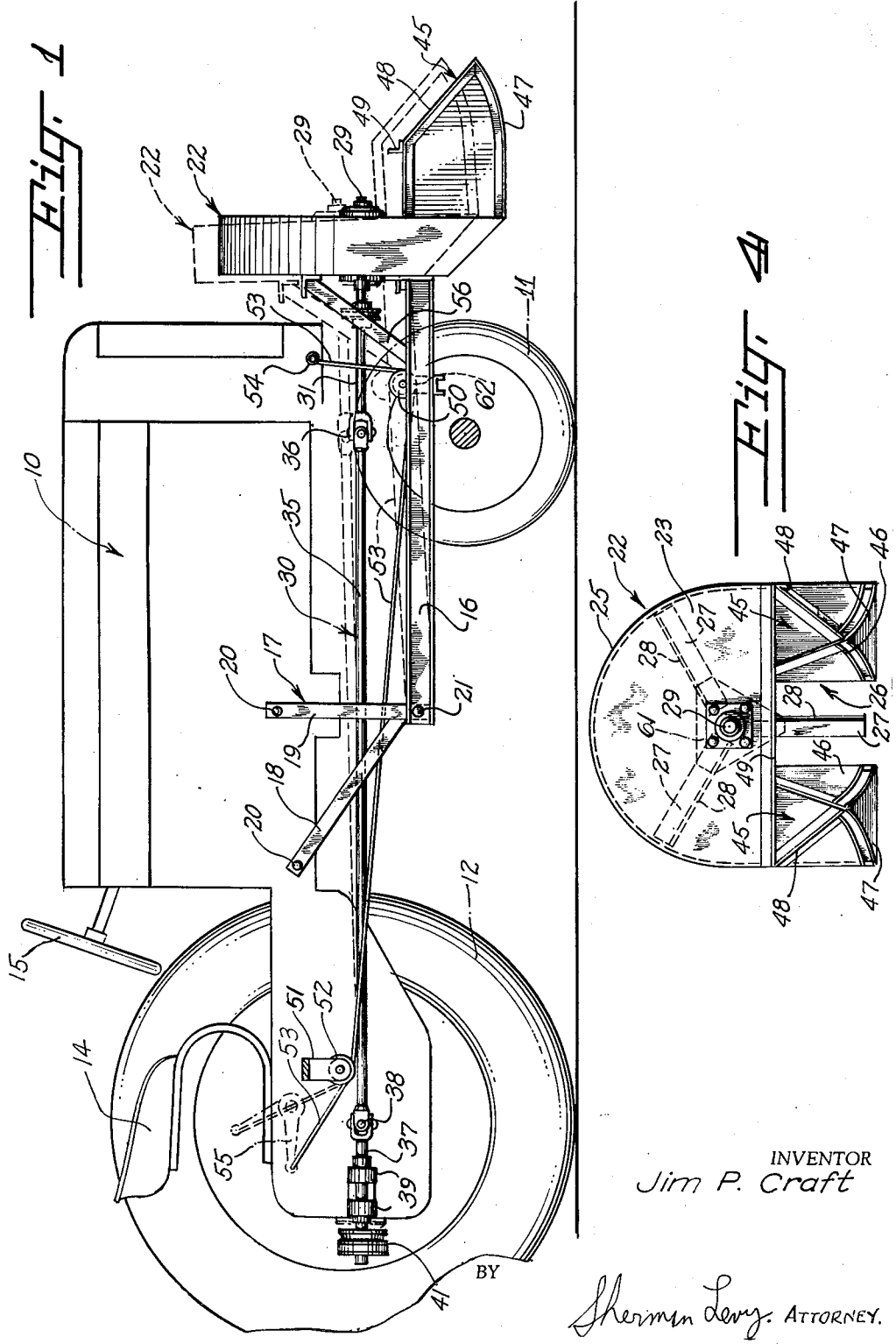
INVENTOR
Jim P. Craft
BY
Sherman Levy. ATTORNEY.

March 17, 1953  J. P. CRAFT  2,631,419
STALK CUTTER
Filed April 10, 1951  2 SHEETS—SHEET 2
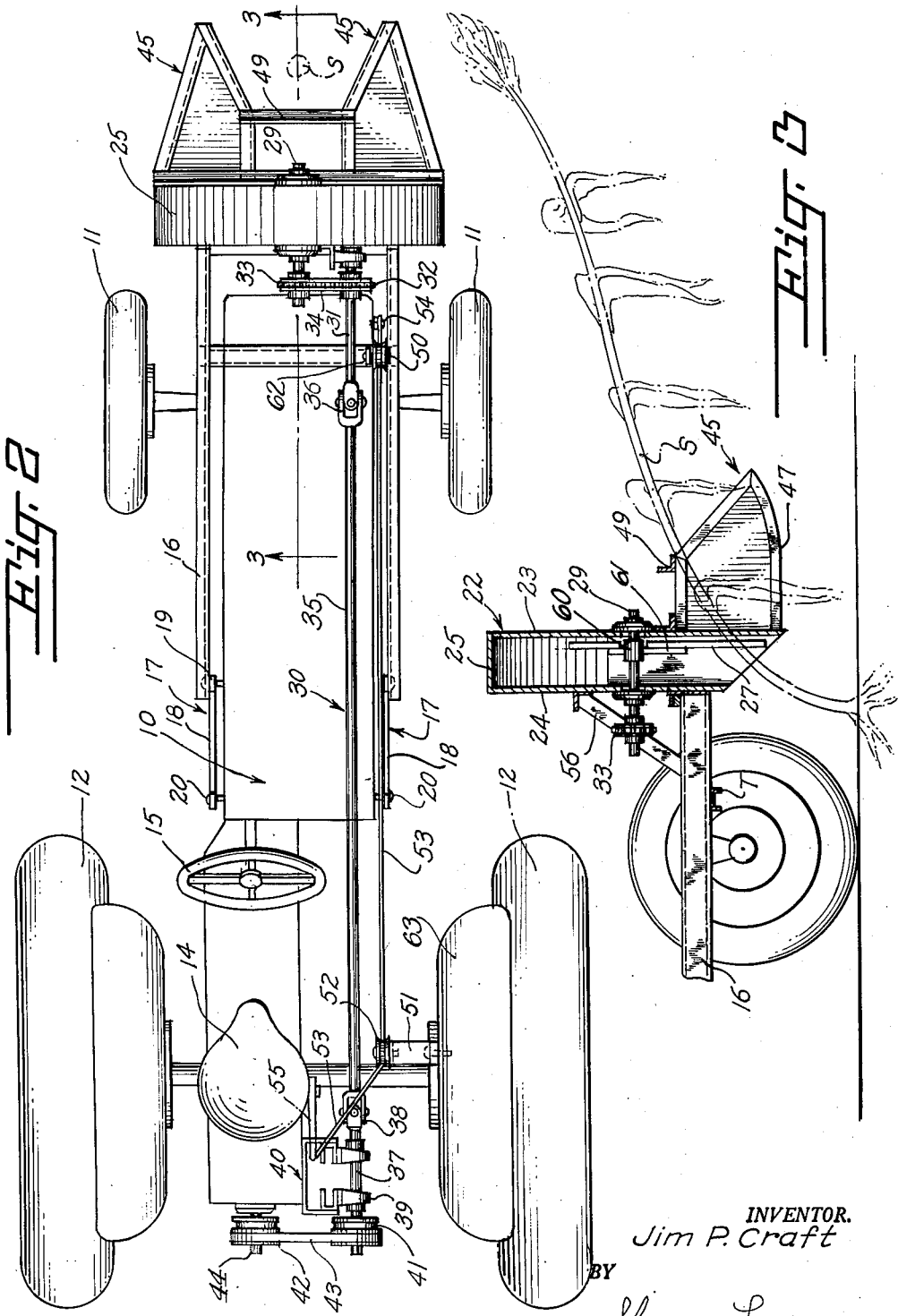
INVENTOR.
Jim P. Craft
BY
Sherman Levy
ATTORNEY.

Patented Mar. 17, 1953

2,631,419

UNITED STATES PATENT OFFICE 2,631,419

STALK CUTTER

Jim P. Craft, Greeneville, N. C.

Application April 10, 1951, Serial No. 220,189

1 Claim. (Cl. 55—113)

This invention relates to agricultural equipment, and more particularly a stalk cutter for attachment to a power driven vehicle, such as a tractor.

The object of the invention is to provide a mechanism for attachment to a tractor, whereby upon movement of the tractor along a field, upstanding stalks, such as corn stalks, will be effectively severed or cut.

Another object of the invention is to provide a stalk-cutting mechanism which is adapted to be attached to tractors of various sizes and makes, the mechanism being adjustable so that the stalks can be cut at any desired height.

A further object of the invention is to provide a stalk-cutting mechanism which is extremely simple and inexpensive to manufacture.

Other objects and advantages will be apparent during the course of the following description.

In the accompanying drawings forming a part of this application, and in which like numerals are used to designate like parts throughout the same:

Figure 1 is a side elevational view of the stalk-cutting mechanism of the present invention attached to a tractor, the tractor being shown in broken lines;

Figure 2 is a top plan view of the assembly of Figure 1;

Figure 3 is a sectional view taken on the line 3—3 of Figure 2;

Figure 4 is a front elevational view of the cutting mechanism.

Referring in detail to the drawings, the numeral 10 designates a conventional tractor, Figures 1 and 2, and the tractor 10 is provided with front wheels 11 and rear wheels 12, there being a seat 14 for conveniently supporting the driver of the tractor or vehicle. The steering wheel mechanism is indicated by the numeral 15.

The present invention is directed to a mechanism for cutting or severing growing stalks S, Figure 3, and the stalks S may be corn stalks or any other growing crop. Thus, as the tractor 10 moves along a field of growing stalks or crops, the stalks will be effectively severed at the desired height by means of the mechanism of the present invention. The stalk-cutting mechanism of the present invention includes a pair of spaced parallel beams or channel members 16 which are arranged on opposite sides of the tractor 10. The beams 16 each have their rear end pivotally connected to the bottom of a bracket 17, the bracket 17 having a substantial V shape. Each of the brackets 17 includes a pair of braces 18 and 19 which have their upper ends secured by suitable securing elements, such as rivets or bolts 20, to the sides of the tractor. A pin 21 pivotally connects the rear end of each of the beams 16 to the bottom of the bracket 17.

Extending between the front ends of the beams 16 and secured thereto in any suitable manner is a housing 22 which may be fabricated of any suitable material, such as metal. The housing 22 includes a front wall 23 and a rear wall 24, there being an arcuate wall 25 extending between the front and rear walls. The front of the housing 22 is open, as at 26, Figures 4, so that the stalks S can be guided into the housing.

Rotatably supported by the housing 22 is a stub shaft 29, Figure 3. The stub shaft 29 has mounted thereon a sleeve 60, and projecting from the sleeve 60 is a plurality of radially spaced cutting blades 27, each of which is provided with a beveled cutting edge 28, there being a strengthening plate 61 extending between the blades 27. A means is provided for causing rotation of the stub shaft 29 and blades 27, and this means comprises a shaft 30 which may extend longitudinally along the tractor 10. The shaft 30 includes a plurality of sections which are pivotally connected together, the shaft 30 including a first shaft section 31 that has a sprocket 32 mounted thereon, Figure 2. A similar sprocket 33 is mounted on the rear end of the stub shaft 29, and a chain 34 is trained over the pair of sprockets 32 and 33.

A second section 35 is pivotally or hingedly connected to the first section 31 by means of a universal coupling 36, while a third section 37 is hingedly or pivotally connected to the second section 35 by means of a universal coupling 38. For supporting the third section 37, bearings 39 rotatably engage the third section 37, the bearings 39 being secured to a support member 40, which can be connected to the tractor 10 in any suitable manner.

Mounted on the rear end of the third section 37 is a pulley 41, and a similar pulley 42 is mounted on the tractor power take-off 44. An endless belt 43 is trained over the pulleys 42 and 41, so that upon actuation of the tractor power take-off the shaft 30 can be rotated to thereby cause rotation of the stub shaft 29 and cutting blades 27, whereby the stalks S can be effectively severed.

A pair of spaced guide members 45 project forwardly from the housing 22 for helping to guide the stalks S into the path of the revolving cutting blades 27. Each of the guide members 45 includes an inclined side plate 46 and an arcuate bottom member 47. A brace 48 extends rearwardly from the junction of the side portion 46 and the bottom member 47, for strengthening the guide members. Extending between the pair of guide members 45 and secured thereto is a bar or angle iron 49, the angle iron 49 serving to bend the stalks S as the tractor progresses along the field, whereby the cutting blades 27 can effectively function, as shown in Figure 3.

A means is provided for raising and lowering the housing 22 and the cutting blades, so that the stalks S can be cut or severed at any desired height. This means comprises a first pulley 50 which may be rotatably supported by a bracket 62 connected to one of the beams 16. A second pulley 52 is arranged rearwardly of the first pulley 50, and the second pulley 52 may be rotatably supported by means of a bracket 51 that can be secured to one of the mud guards 63 of the tractor. Trained beneath a pair of pulleys 50 and 52 is a cable 53, the cable 53 having its front end secured to the tractor 10 by means of a suitable securing element, such as a rivet or bolt 54. The rear end of the cable 53 is adapted to be connected to the tractor hydraulic lift 55. Thus, upon actuation of the tractor hydraulic lift 55, the cable 53 will be moved so that the parts of the stalk-cutting mechanism can be moved from the solid line position shown in Figure 1 to the dotted line position shown in Figure 1, and vice versa. Thus, the stalks S can be severed at any desired elevation or height. Suitable inclined braces 56 may extend between the rear of the housing 22, and the beam 16, for reinforcing the housing 22.

In use, the tractor 10 may be driven along a field of growing crops, such as corn or other agricultural products. Then, the stalks S which may be corn stalks will be directed or guided into the path of the revolving cutting blades 27 by means of the guide members 45. This action is shown in Figure 3, and it will be seen that the cutting blades 27 will be rotated or driven by means of the stub shaft 29, the stub shaft 29 having the sprocket 33 mounted thereon. The chain 34 is trained over the sprocket 33, and the sprocket 32, so that when the shaft 30 is rotated by means of the belt 43 which leads from the tractor power take-off 44, the cutting blades will rotate. Further, the elevation of the housing 22 and consequently the cutting blades can be adjusted as desired so that the stalks S can be severed at any desired elevation. To adjust these parts, the tractor hydraulic lift 55 is actuated whereby the cable 53 can be adjusted, whereby the beam 16 will pivot about the pins 21 so that the housing 22 and blades therein can be raised or lowered.

The mechanism of the present invention can be attached to various sizes and makes of tractors, and the mechanism can be used for cutting various crops or stalks.

What is claimed is:

A stalk cutting mechanism for attachment to a tractor having a power take-off, comprising a beam extending longitudinally along each side of said tractor adjacent the front end thereof, a depending bracket secured intermediate the longitudinal extent of the tractor and at each side thereof, the rear ends of said beams being pivotally secured to the lower end of said bracket, a vertically extending housing having an open bottom end and an arcuate top wall, said housing being secured to the front ends of said beams; a pair of spaced guide members projecting forwardly and upwardly from the lower end of said housing, a horizontally disposed bar extending between said pair of guide members and in advance of said housing and secured to said guide members, a stub shaft extending longitudinally of said tractor and mounted in said housing, a plurality of radially extending cutter blades mounted on said stub shaft, a drive shaft extending longitudinally along the tractor and including a plurality of flexible sections, a first section having a sprocket thereon, means connecting said sprocket to said stub shaft, a second section pivotally connected to said first section, belt and pulley means connecting said second section to the power take-off on the tractor, and means interconnecting said tractor and beams for raising and lowering said housing whereby said blades and housing may be vertically adjusted.

JIM P. CRAFT.

REFERENCES CITED

The following references are of record in the file of this patent:

UNITED STATES PATENTS

| Number | Name | Date |
|---|---|---|
| 1,528,553 | Kennedy et al. | Mar. 3, 1925 |
| 2,263,886 | Munro | Nov. 25, 1941 |
| 2,479,510 | Pollard et al. | Aug. 16, 1949 |
| 2,485,383 | Hoyt | Oct. 18, 1949 |